United States Patent
Larsen

(10) Patent No.: US 8,031,612 B2
(45) Date of Patent: Oct. 4, 2011

(54) ALTERING OPERATION OF A NETWORK INTERFACE CONTROLLER BASED ON NETWORK TRAFFIC

(75) Inventor: Steen Larsen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 12/283,306

(22) Filed: Sep. 11, 2008

(65) Prior Publication Data

US 2010/0061245 A1   Mar. 11, 2010

(51) Int. Cl.
*H04L 12/26* (2006.01)

(52) U.S. Cl. ........ 370/237; 370/230; 370/235; 709/235; 718/105

(58) Field of Classification Search ........... 370/237, 370/229, 230, 235, 238, 389, 392; 709/235; 718/105
See application file for complete search history.

(56) References Cited

U.S. PATENT DOCUMENTS

| | | | |
|---|---|---|---|
| 6,546,496 B1 | 4/2003 | Wang et al. | |
| 6,904,040 B2 | 6/2005 | Salapura et al. | |
| 6,920,110 B2 | 7/2005 | Roberts et al. | |
| 7,324,540 B2 | 1/2008 | Vangal et al. | |
| 2003/0023885 A1* | 1/2003 | Potter et al. | 713/300 |
| 2003/0074388 A1* | 4/2003 | Pham et al. | 709/106 |
| 2003/0188208 A1* | 10/2003 | Fung | 713/320 |
| 2004/0095934 A1 | 5/2004 | Cheng et al. | |
| 2005/0086393 A1* | 4/2005 | Meng et al. | 710/1 |
| 2006/0153215 A1* | 7/2006 | Cornett et al. | 370/412 |
| 2006/0195698 A1* | 8/2006 | Pinkerton et al. | 713/181 |
| 2007/0121662 A1* | 5/2007 | Leech | 370/412 |
| 2008/0114781 A1* | 5/2008 | Yin et al. | 707/100 |
| 2009/0028045 A1* | 1/2009 | Stellenberg et al. | 370/230 |
| 2009/0161548 A1* | 6/2009 | Zhu et al. | 370/237 |
| 2009/0288088 A1* | 11/2009 | Orii | 718/102 |
| 2010/0037038 A1* | 2/2010 | Bieswanger et al. | 712/220 |

FOREIGN PATENT DOCUMENTS

WO   01/50247 A3   7/2001

OTHER PUBLICATIONS

"Scalable Networking: Eliminating the Receive Processing Bottleneck—Introducing RSS", WinHEC 2004 Version, Dated Apr. 14, 2004. pp. 1-17.
Office Action Received for U.S. Appl. No. 10/678,576, mailed Dec. 6, 2006, 26 Pages.
Office Action Received for U.S. Appl. No. 10/678,576, mailed Oct. 24, 2006, 23 Pages.
Office Action Received for U.S. Appl. No. 10/678,576, mailed May 15, 2006, 12 Pages.
Advisory Action Received for U.S. Appl. No. 10/678,576, mailed Feb. 21, 2007, 3 Pages.

* cited by examiner

*Primary Examiner* — Luat Phung

(57) ABSTRACT

A method includes, at a network interface controller receiving packets from a network connection for a set of multiple coupled processors, distributing received packets to each of a first set of the processors. In response to determining the change in network traffic, operation of the network interface controller is altered to distribute packets to a second set of the processors.

13 Claims, 4 Drawing Sheets

ALTERING OPERATION OF A NETWORK INTERFACE CONTROLLER BASED ON NETWORK TRAFFIC

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A series of related packets can form a connection. A connection is often identified by a combination of different portions of a packet known as a tuple. For example, a tuple is commonly formed by a combination of source and destination information of a packet header.

A variety of networking protocols maintain state information for a connection. For example, the Transmission Control Protocol (TCP) stores state data for a connection in a Transmission Control Block (TCB). A TCB includes state data such as the last received byte, the last successfully transmitted byte, and so forth. Typically, connection state data is accessed and, potentially, updated for each packet in a connection. In a multi-processor system, this can create contention issues between processors handling packets for the same connection. That is, for example, different processors handling data for the same connection may each attempt to access a connection's state data at the same time, creating requirements for data locking and introducing delay as the processors wait for access to the connection state data.

Contention between the processors, however, can be reduced by mapping respective connections to the respective processors. For example, a network interface controller (NIC) may perform a hash on a tuple of a received packet and use the hash to determine a processor to handle a given packet. Directing packets in a flow to the same processor can help pin down state information. This can enable the processor to retain the state data for a connection in local processor memory (e.g., cache memory) and reduce contention between processors trying to access the same connection state data.

DETAILED DESCRIPTION

Figure 1A:
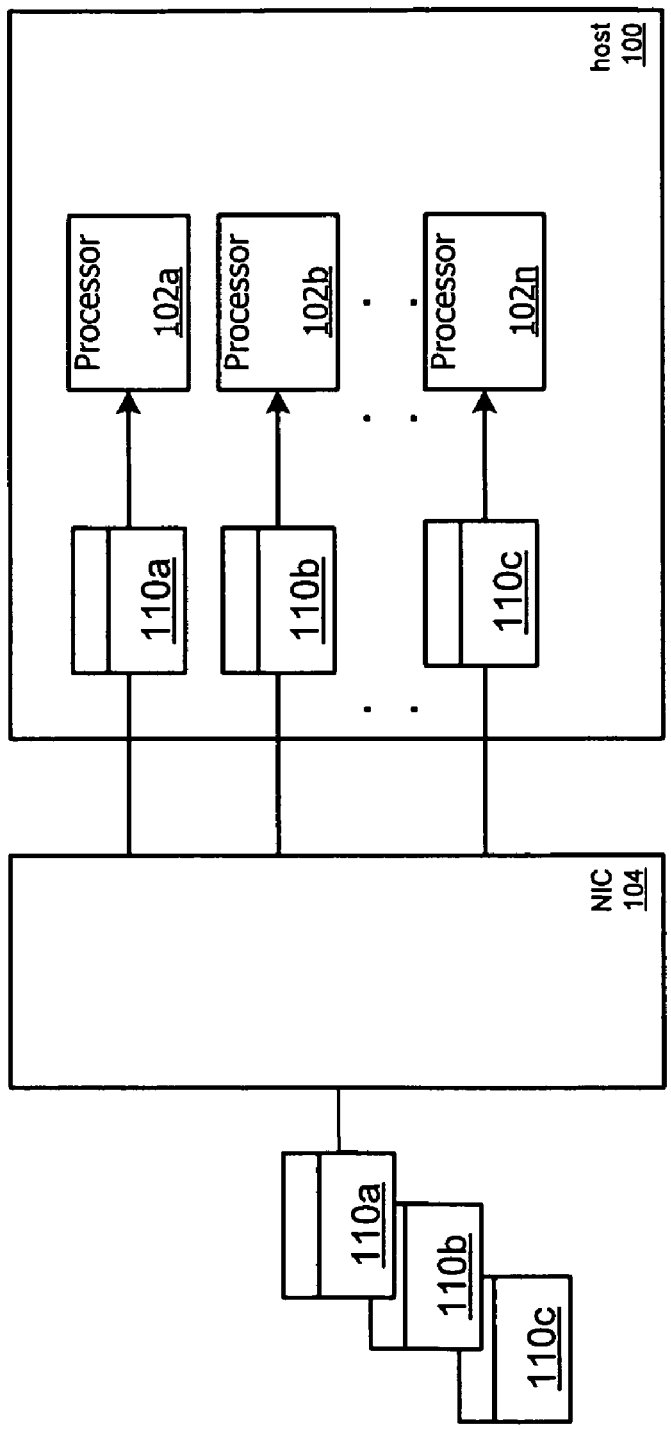
FIG. 1A is a diagram illustrating distribution of packets to processors.

FIG. 1A depicts a network host 100 that includes multiple processors 102a-102n. For example, the processors 102a-102n may be multiple cores integrated on a single die or on multiple dies within a single integrated circuit package. The processors 102a-102n may share one or more Internet Protocol (IP) addresses and are commonly serviced by network interface controller (NIC) 104. As shown, the NIC 104 distributes packets 110a-110c received over a network connection to the multiple processors 102a-102n. For example, the NIC 104 may map packets to processors 102a-102n based on their flow tuple. As illustrated in FIG. 1A, a NIC 104 can, approximately, distribute flows evenly across processors 102a-102n. After mapping a packet 110a-110c to a processor 102a-102n, the NIC 104 can queue an entry for a packet in a receive queue (not shown) associated with the mapped processor.

Figure 1B:
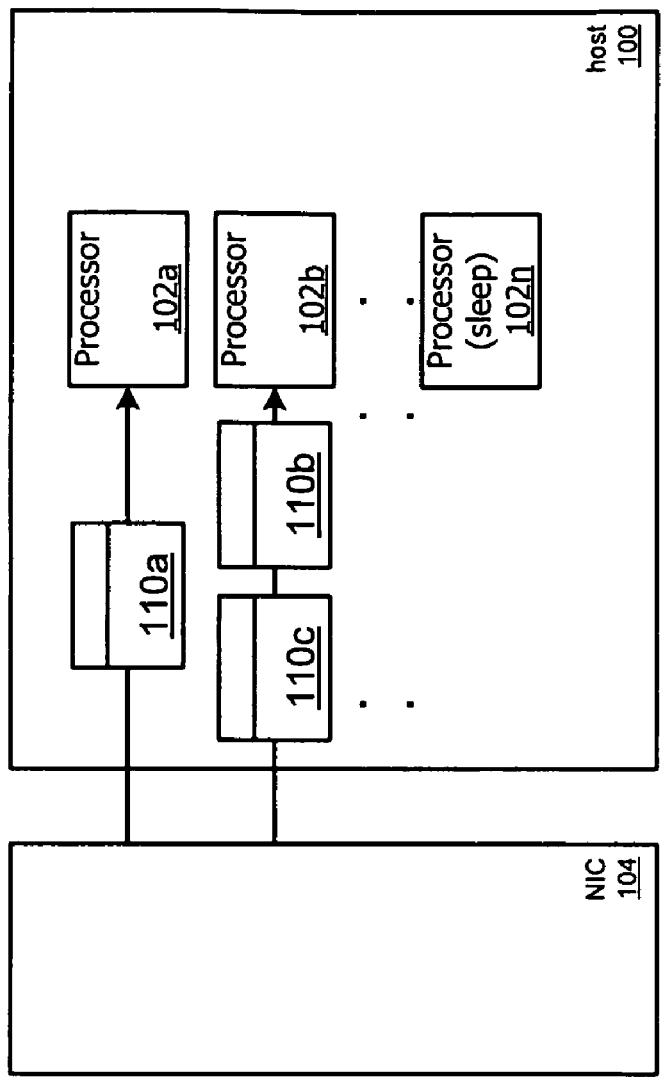
FIG. 1B is a diagram illustrating distribution of packets to a reduced number of processors.

Network traffic handled by a host 100 may rise and fall at different times. For example, as shown in FIG. 1B, in response to determining a drop in network traffic, operation of the NIC 104 is altered to distribute packets to a smaller set of processors 102a-102n. This can allow a processor 102n to enter a comparatively lower power consumption mode (e.g., from power consumption modes Cx to Cy and/or Px to Py where y>x). The ability to concentrate flows in a set of fewer processors can save a tremendous amount of power and reduce heat generation.

In response to increasing network traffic, operation of the NIC 104 may be similarly altered to distribute packets to a larger set of processors 102a-102n. For example, in response to increasing network traffic, NIC 104 may again map packets 110a-110c to an increased number of processors 102a-102n, e.g., as shown in FIG. 1A and processor 102n may enter a comparatively higher power consumption state (e.g., from Cy to Cx and/or Py to Px]).

Figure 2:
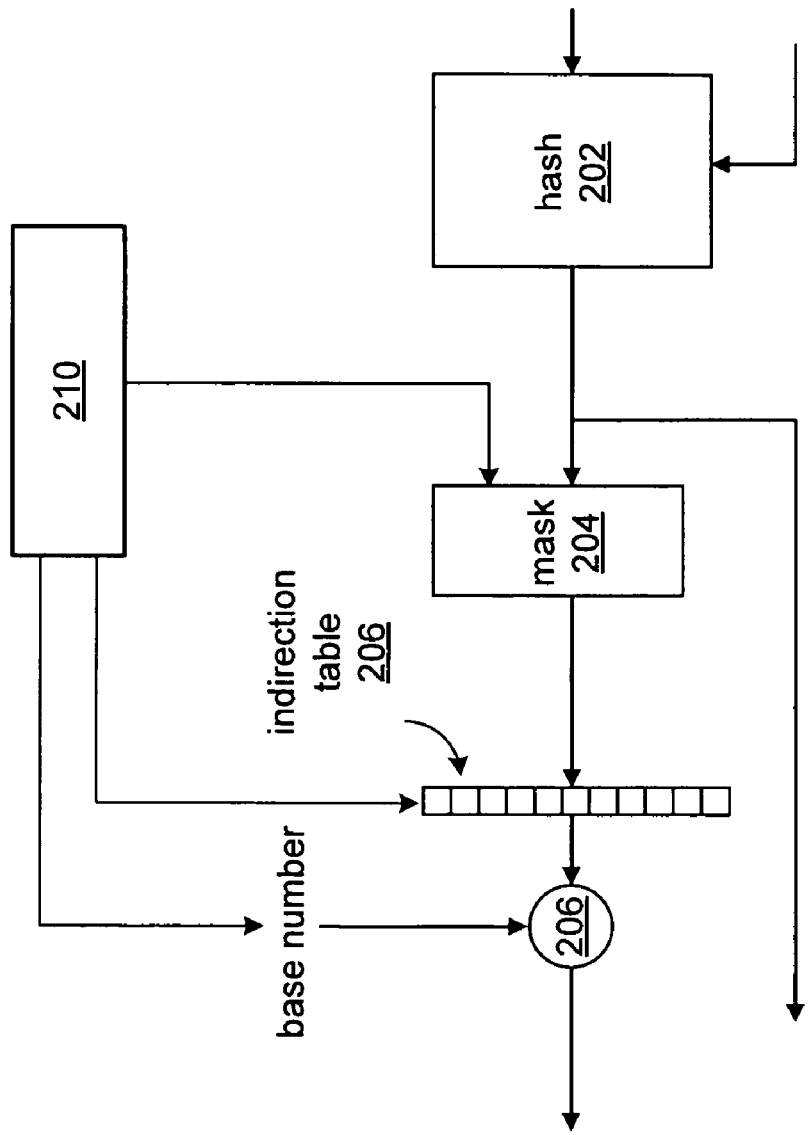
FIG. 2 is a diagram illustrating sample techniques to alter operation of a network interface controller.

FIG. 2 depicts a sample NIC 104 implementation with circuitry that determines a processor to receive a packet. As shown, hash 202 circuitry may perform a hash operation (e.g., a Toeplitz hash) on a packet tuple. For example, for an IP datagram (i.e., and IPv4 or IPv6 datagram) encapsulating a TCP segment (a TCP/IP packet), a tuple may comprise the IP source and IP destination addresses and the TCP source port and destination port. A hash mask 204 is applied to the hash output to reduce the number of bits used to select an entry in an indirection table 206. Using the bits of the hash selected by the mask as an index into the indirection table 206 yields an integer value. The integer value indicated by the indirection table 206 may be added 208 to a base number to finally yield a processor number that uniquely identifies a one of the processors 102a-102n.

As shown in FIG. 2, the NIC 202 may feature circuitry 210 that can alter the mapping of flows to processors by changing data used in the packet/processor mapping. For example, the circuitry 210 may change the mask value 204 applied to the hash bits to mask a greater set of bits. This can reduce the number of processors that are mapped to flows. Similarly, decreasing the number of masked bits can increase the number of processors mapped to flows.

As also shown in FIG. 2, the data stored in the indirection table 206 may be altered to increase or decrease the number of processors mapped to flows. For example, the indirection table 206 may be repopulated by circuitry 210 to simply refer to a greater or lesser set of integer values.

As also shown, the base number may also be altered. For example, increasing the base number will result in flows being mapped to fewer processors while decreasing the base number will result in flows being mapped to a greater number of processors.

FIG. 2 merely depicts a few of many possible different techniques. Other implementations may vary. For example, a NIC may feature different hash algorithms or hash parameters that can be loaded based on a change in network traffic. Further, while FIG. 2 depicted ways circuitry 210 can alter the number of processors mapped to flows, circuitry 210 may implement any of these or other techniques individually or in combination. Finally, while FIG. 2 illustrated an implementation that featured a hash, hash mask, and indirection table, other NIC implementations may not feature one or more or any of these components.

While FIG. 2 depicted sample techniques to alter the number of processors mapped to flows by a NIC, how alteration is initiated may vary. For example, in some implementations the NIC may initiate an increase or decrease in the number of processors mapped to flows. For example, the NIC may be configured to increase or decrease the number of processors based on the time of day or other event.

In some implementations, the NIC may monitor network traffic to determine an increase or decrease in network traffic meriting an increase or decrease in the number of processors. For example, the NIC may maintain a count of packets received, or some other RMON (Remote Monitoring) statistic, to determine a change in network traffic. A NIC may also maintain a count of the number of on-going TCP/IP connections and initiate a change in processor mapping in response to a rise or fall in the connection count To avoid processor wake/sleep thrash, the NIC may compare changes in network traffic measurements against thresholds. For example, the NIC may implement a table associating network traffic levels with numbers of processors. Alternately, the NIC may simply increase or decrease the number based on the amount of change of a measure of network traffic exceeding (or equaling) some threshold. As an example, the NIC may adjust to bursts, for example, when a measurement of network traffic increases by 10% of peak in 1-second, the NIC may increase the number of processors mapped to flows.

A NIC may use other metrics to determine when to initiate a change in the number of processors mapped to flows. For example, a NIC may monitor the queue counts of receive queues, and if a queue count drops to some level (e.g., 10% of available) the NIC may reduce the number of processors mapped to flows. In this particular instance, to minimize re-mapping of on-going connections, the processor associated with the comparatively inactive receive queue may be removed from the set of processors, for example, by replacing integer values associated with the processor in the indirection table 206 to other processor values.

The particular metrics and/or change triggering events (e.g., thresholds exceeded) may be configurable. For example, configuration may be performed via a network driver executed by a processor. For example, the network driver may specify values of one or more object identifiers configuring operation of the NIC. For example, such configuration data may control whether or not the number of processors mapped is altered based on network traffic, which metric (s) are used, what triggers an increase or reduction, thresholds or other rules applied, and so forth. The configuration data may select an operation mode of the network interface controller from multiple modes of operation that includes a mode that, in response to a change in network traffic, alters operation of the network interface controller to change processor distribution of received packets from a first set of multiple processors to a second set of multiple processors coupled to the network interface controller and at least one mode that does not.

A potential downside of the techniques described above is that when traffic ramps up, the processors need to be woken up, requiring a few microseconds of added latency. To avoid this problem, a NIC may predictively ping a processor, causing a processor to wake (enter a comparatively higher power consumption mode) and hide wakeup latency as the NIC determines increasing traffic patterns. As an example, an increase of total throughput by 5% may cause the NIC to initiate a wakeup of a processor while a 10% increase will trigger a remapping of flows to processors to include the "woken" processor.

In an alternate implementation, the NIC does not initiate a change in the set of processors mapped to flows but is instead controlled by host 100 processors 102*a*-102*n*. For example, an operating system may monitor system load and/or network traffic handled and issue reconfiguration commands to the NIC instructing the NIC to increase or decrease the number of processors mapped to flows.

Figure 3:
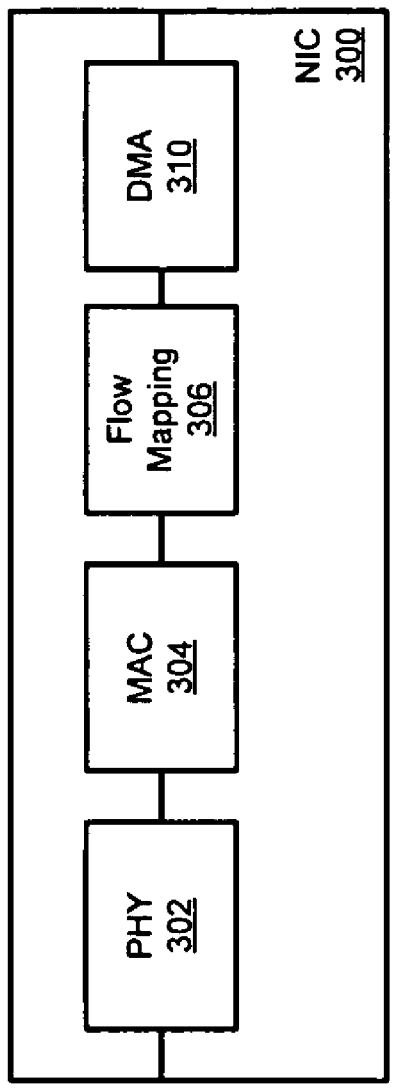
FIG. 3 is a diagram of a sample network interface controller.

FIG. 3 depicts a sample NIC 300 implementing techniques described above. As shown, the NIC 300 includes a PHY 302 (physical layer device) (e.g., wired or wireless PHY) and a MAC (media access control) 304. The NIC 300 may also feature a DMA (Direct Memory Access) engine 310 to transfer packet data to host memory or directly to a host processor for example via a chipset, interconnect, or other communication medium. In the sample shown, the NIC 300 includes mapping circuitry 306 for use in determining a processor 102*a*-102*n* to handle a packet. The circuitry 306 can implement techniques described above to alter the set of processors mapped to flows.

Figure 1B:
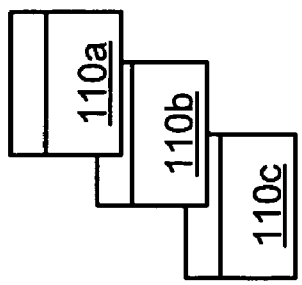

While FIGS. 1-3 depicted sample implementations and sample environments, many other implementations are possible. For example, the system of FIG. 1 may feature a single or multiple NICs. Further, circuitry described above need not be located in a NIC, but may instead may be located elsewhere in the host, such as in a chipset, processor 102*a*-102*n* circuitry, or instructions executed by a processor 102*a*-102*n*.

The term packet as used herein encompasses protocol data units (PDUs) for a wide variety of network protocols featuring a header and payload. A packet may be an encapsulated or encapsulating packet. Further, a given tuple may feature data from zero or more encapsulated packet headers and may or may not feature data from an encapsulating packet header.

The techniques described above may be implemented in a variety of software and/or hardware architectures. The term circuitry as used herein includes hardwired circuitry, digital circuitry, analog circuitry, programmable circuitry, and so forth. The programmable circuitry may operate on instructions stored on a computer readable storage medium.

Other embodiments are within the scope of the following claims.

What is claimed is:

1. A method, comprising:

at a network interface controller receiving packets from a network connection for a set of multiple coupled processors:

distributing received packets to each of a first set of the multiple coupled processors;

determining a first increase in network traffic;

based at least in part on the determining the first increase in network traffic, increasing the power consumption mode of at least one processor not in the first set of multiple processors, the at least one processor not receiving the distributed packets until a determined second increase in network traffic;

determining the second increase in network traffic; and based at least in part on the determining the second increase in network traffic and after the determining the first increase, altering operation of the network interface controller to distribute packets to a second set of the multiple coupled processors, the first set of the multiple coupled processors having a different number of processors than the second set of the multiple coupled processors, the second set of multiple coupled processors comprising the at least one processor set to an increased consumption mode, the at least one processor set to the increased consumption mode to, thereafter, receive packets distributed to the second set of multiple coupled processors;

wherein altering operation of the network interface controller comprises at least one of the following:

(a) adjusting a mask applied to a hash value derived from packet contents;

(b) changing values of an indirection table associating a number with a masked hash value derived from packet contents; or (c) altering a base processor number added to output of an indirection table associating a number with a masked hash value derived from packet contents.

2. The method of claim 1, wherein the determining the first increase in network traffic comprises determining based on a count of packets received by the network controller.

3. The method of claim 1, wherein the determining the first increase in network traffic comprises determining based on at least one queue count of at least one receive queue from a set of multiple receive queues.

4. The method of claim 1, further comprising causing, by the network interface controller, a processor in the first set of multiple coupled processors to enter a less active power consumption mode.

5. The method of claim 1, further comprising causing, by the network interface controller, a processor in the second set of multiple coupled processors to enter a more active power consumption mode.

6. The method of claim 1, further comprising:

prior to altering operation of the network controller to map flows to a processor in the second set of multiple coupled processors, predictively causing the processor in the second set of multiple coupled processors to enter a more active power consumption mode.

7. The method of claim 1, further comprising receiving data from a source external to the network interface controller instructing the network interface controller to change a number of processors in a set of multiple coupled processors currently receiving distributed packets.

8. The method of claim 1, further comprising:

determining a number of processors to handle received packets based on data associating network traffic levels with a number of processors.

9. A network interface controller comprising circuitry to:

receive packets from a network connection for a set of multiple coupled processors;

distribute received packets to each of a first set of the multiple coupled processors;

determine a first increase in network traffic;

based at least in part on the determining the first increase in network traffic, increase the power consumption mode of at least one processor not in the first set of multiple processors, the at least one processor not receiving distributed packets until a determined second increase in network traffic;

determine the second increase in network traffic; and based at least in part on the determining the second increase in network traffic, alter operation of the network interface controller to distribute packets a second set of the multiple coupled processors, the first set of the multiple coupled processors having a different number of processors than the second set of the multiple coupled processors, the second set of multiple coupled processors comprising the at least one processor set to an increased consumption mode, the at least one processor set to the increased consumption mode to, thereafter, receive packets distributed to the second set of multiple coupled processors;

wherein the circuitry to alter operation of the network interface controller comprises circuitry to perform at least one of the following:

(a) adjust a mask applied to a hash value derived from packet contents;

(b) change values of an indirection table associating a number with a masked hash value derived from packet contents; or (c) alter a base processor number added to output of an indirection table associating a number with a masked hash value derived from packet contents.

10. The network interface controller of claim 9, wherein the circuitry to determine the first increase in network traffic comprises circuitry to determine based on a count of packets received by the network controller.

11. The network interface controller of claim 9, wherein the circuitry comprises circuitry to cause a processor in the first set of multiple coupled processors to enter a less active power consumption mode.

12. The network interface controller of claim 9, wherein the circuitry comprises circuitry to cause a processor in the first set of multiple coupled processors to enter a more active power consumption mode.

13. The network interface controller of claim 9, wherein the circuitry comprises circuitry to, prior to altering operation of the network controller, preemptively cause a processor in the second set of multiple coupled processors to enter a more active power consumption mode.

* * * * *